United States Patent [19]
Poisner

[11] Patent Number: 6,070,204
[45] Date of Patent: May 30, 2000

[54] METHOD AND APPARATUS FOR USING UNIVERSAL SERIAL BUS KEYBOARD TO CONTROL DOS OPERATIONS

[75] Inventor: David Poisner, Folsom, Calif.

[73] Assignee: Intel Corporation, Santa Clara, Calif.

[21] Appl. No.: 09/003,419

[22] Filed: Jan. 6, 1998

[51] Int. Cl.7 .................................................. G06F 13/00
[52] U.S. Cl. .................. 710/100; 710/1; 710/4; 710/33; 710/43; 710/62; 710/262; 707/101; 709/300
[58] Field of Search ............................... 710/1, 4, 33, 43, 710/100, 262, 62; 709/300; 707/101

[56] References Cited

U.S. PATENT DOCUMENTS

| | | | |
|---|---|---|---|
| 5,802,318 | 9/1998 | Murray et al. | 710/100 |
| 5,832,492 | 11/1998 | Wooten | 707/101 |
| 5,835,791 | 11/1998 | Goff et al. | 710/62 |
| 5,841,424 | 11/1998 | Kikinis | 345/168 |
| 5,893,064 | 9/1998 | Kudirka et al. | 704/275 |
| 5,896,534 | 4/1999 | Pearce et al. | 709/300 |

*Primary Examiner*—Ayaz R. Sheikh
*Assistant Examiner*—Frantz Blanchard Jean
*Attorney, Agent, or Firm*—Blakely, Sokoloff, Taylor & Zafman LLP

[57] ABSTRACT

A method, apparatus, and article of manufacture for generating signals using a Universal Serial Bus (USB) host controller and USB keyboard. Data generated by the keyboard is marked as being used with an operating system which responds to keyboard generated interrupts and which reads keyboard data stored in a register. The marked data is detected after it is received from the keyboard and is transferred to a register. An interrupt to a central processing unit (CPU) is then generated in response to the marked data being transferred to the register.

22 Claims, 4 Drawing Sheets

1

METHOD AND APPARATUS FOR USING UNIVERSAL SERIAL BUS KEYBOARD TO CONTROL DOS OPERATIONS

FIELD OF THE INVENTION

This invention relates to digital computers and, more particularly, to a method, apparatus, and article of manufacture for using an Universal Serial Bus (USB) keyboard to generate signals for controlling legacy hardware devices functioning with legacy operating system software.

BACKGROUND OF THE INVENTION

Most of the personal computers in use today are designed to use a keyboard which provides signals through an interface to a legacy Industry Standard Association (ISA) bus. This interface includes a controller which is designed to translate incoming serial data generated by the keyboard to parallel data, store that data in a buffer register, and generate an interrupt so that the central processing unit may read the data in the register. The controller also allows commands to be sent from the central processing unit to the keyboard controller registers at specific input/output (I/O) addresses for enabling certain functions of the keyboard.

Recently, a new bus, referred to as the Universal Serial Bus (USB), has been introduced. The bus has been designed to allow peripheral devices to be easily connected to Intel-processor-based computers. The Universal Serial Bus provides a uniform connector to which all external peripheral devices connect. The Universal Serial Bus is designed to operate with advanced operating systems which provide bus mastering. In fact, the Universal Serial Bus is designed to function as a bus master and transfer data between connected peripheral devices and main memory. Under such operating systems, each connected device is allotted a portion of a repeating interval by the bus master. By being assigned a fixed percentage of each bus master interval, each device receives a bandwidth of guaranteed size and latency. This allocation of bandwidth makes the bus more amenable to real time operations such as sound and video than prior art circuitry. The parameters of this new bus are described in a preliminary specification entitled *Universal Serial Bus Specification*, Version 1.0, published December, 1996, by Compaq Computer Corp., Digital Equipment Corp., IBM PC Co., Intel Corp., Microsoft Corp., and Northern Telecom, which is incorporated herein by reference.

The Universal Serial Bus provides an entirely new interface for connecting the various peripherals. However, the Universal Serial Bus is not designed to function with legacy devices designed to operate with any of the versions of the Microsoft or PC disk operating systems (DOS). There are no DOS device drivers for the Universal Serial Bus. Consequently, external I/O devices connected to the Universal Serial Bus do not generate or recognize control signals which are used with DOS operations. Unfortunately, many prior software and hardware systems function only with versions of the DOS operating system and cannot utilize the Universal Serial Bus. In fact, most game programs function only with DOS.

It is desirable to be provided a method and apparatus by which a keyboard adapted to function with the Universal Serial Bus may be made to function with legacy DOS programs and hardware.

SUMMARY OF THE INVENTION

The present invention provides a method, apparatus, and article of manufacture for generating signals using a Universal Serial Bus (USB) host controller and USB keyboard. Data generated by the keyboard is marked as being used with an operating system which responds to keyboard generated interrupts and which reads keyboard data stored in a register. The marked data is detected after it is received from the keyboard and is transferred to a register. An interrupt to a central processing unit (CPU) is then generated in response to the marked data being transferred to the register.

BRIEF DESCRIPTION OF THE DRAWINGS

The present invention is illustrated by way of example and may be better understood by referring to the following description in conjunction with the accompanying drawings, in which like references indicate similar elements and in which.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical physical signals to generate other desired physical signals.

DETAILED DESCRIPTION OF A PREFERRED EMBODIMENT OF THE PRESENT INVENTION

Figure 1:
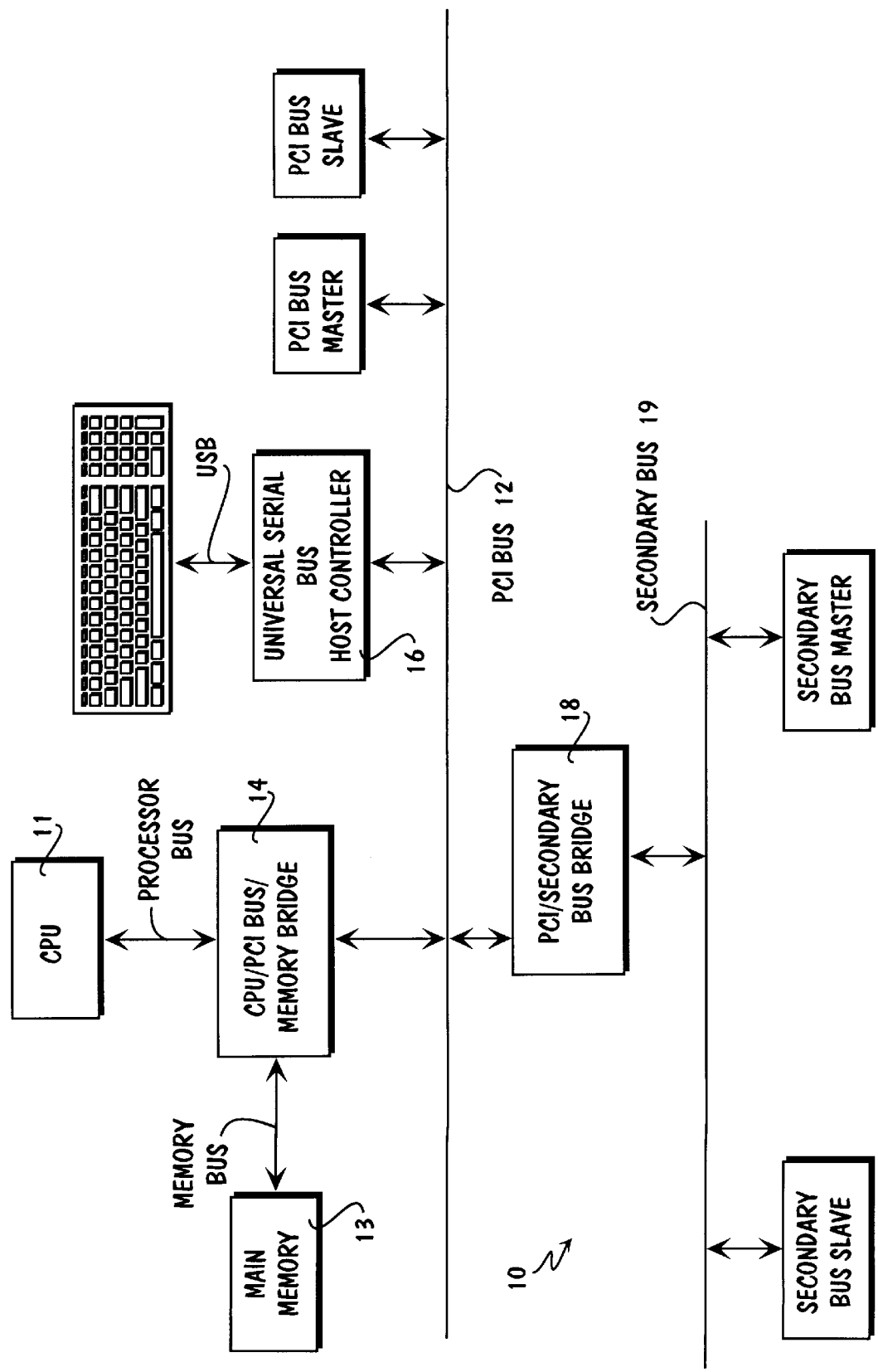
FIG. 1 is a block diagram of a digital system designed in accordance with the present invention.

Referring now to FIG. 1, there is illustrated a block diagram of a computer system 10 configured in accordance with one embodiment of the present invention. The system 10 illustrated includes a central processing unit 11 which executes various instructions provided to control the operations of the system 10. The central processing unit 11 is typically joined by a processor bus to a bridge circuit 14 which controls access to an input/output PCI bus 12 adapted to carry information between the various components of the system 10. The bridge 14 is also typically joined by a memory bus to main memory 13 which is typically constructed of dynamic random access memory arranged in a manner well known to those skilled in the prior art to store information during a period in which power is provided to the system 10. FIG. 1, the PCI bus 12 is preferably a peripheral component interface (PCI) bus or other local bus adapted to provide especially fast transfers of data and capable of handling bus mastering operations. In a typical system 10, various input/output devices are connected as bus master and bus slave circuits to the PCI bus 12.

In a particular system designed to utilize the invention, a USB host controller 16 is joined to the PCI bus 12 as a bus master and may include the present invention. The USB may be connected to a number of USB devices, one of which could be a keyboard. In one embodiment of the invention, a bridge circuit 18 provides interfaces between the PCI bus 12 and an Industry Standard Association (ISA) bus 19 and buffers signals transferred between those buses. There has been a recent tendency toward providing in such a bridge 18 a number of functions which historically have required separate chips. Combining such functions reduces costs and assures that the functions appropriately coordinated with other functions of a computer system. For example, an ISA direct memory access controller (DMA) is one circuit which has been incorporated into such a bridge circuit 18. Similarly, in such an embodiment of the invention, the USB host controller 16 may be the second bridge circuit 18, or can be embedded inside one of the bridges.

Figure 2:
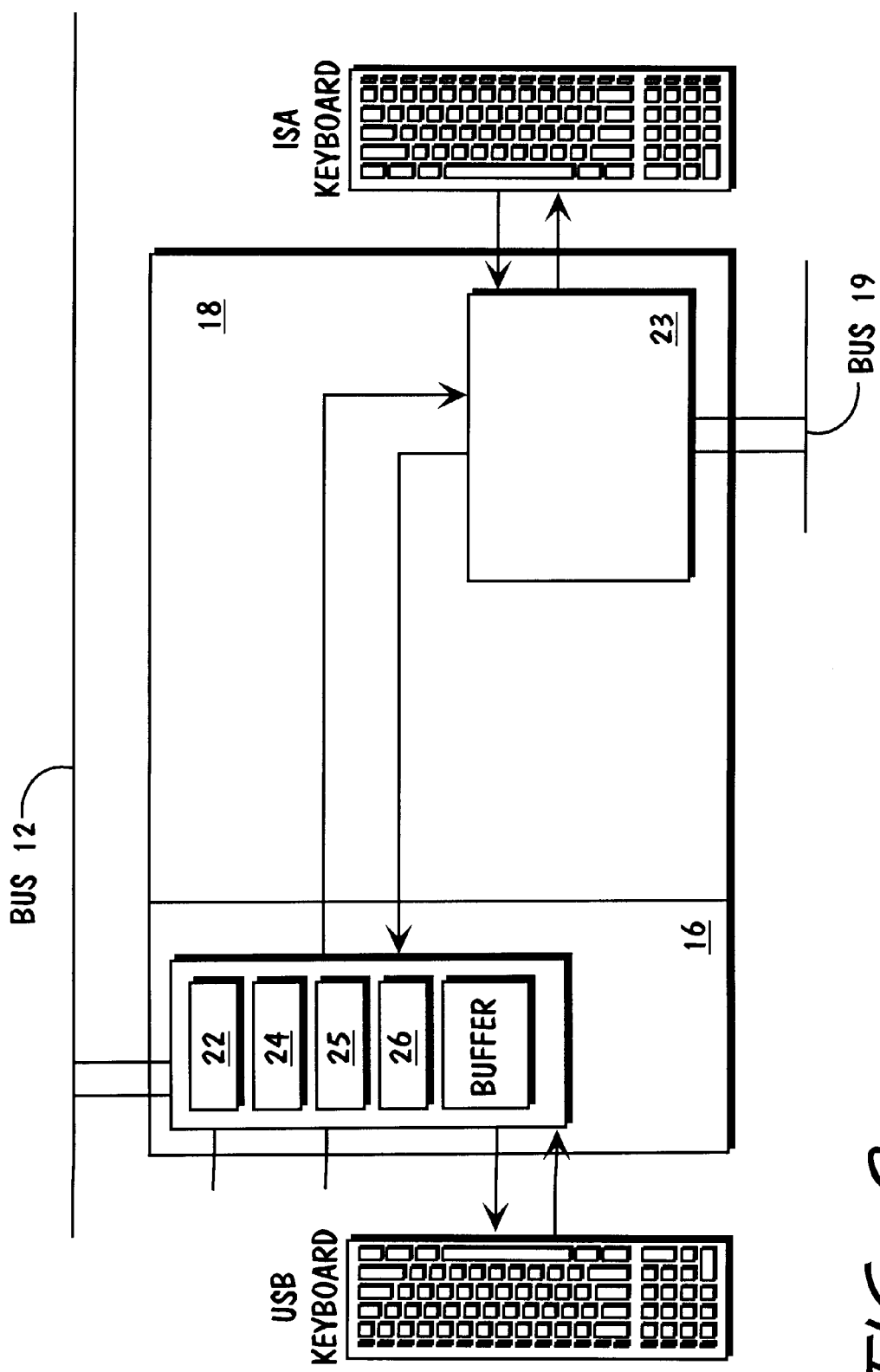
FIG. 2 is a block diagram describing in general detail a bridge circuit illustrated in FIG. 1 which includes a Universal Serial Bus and is joined with a keyboard.

FIG. 2 illustrates a USB host controller 16 which is physically associated with other circuitry on a bridge chip 18. As was described above, the USB host controller 16 functions in one embodiment as a bus master on the PCI bus 12. In order to accomplish this, the USB host controller 16 includes a USB controller circuit 21 which functions in the manner of a DMA controller to transfer data between main memory 13 and I/O devices associated with the USB host controller 16. The USB host controller 16 includes a number of control and status registers. A command written to a command register 22 is executed by the controller. A status register 24 holds data which indicates the various states of the controller. A frame list base address register 26 contains the starting address in system memory of a list of frames of operations to be completed by the USB host controller 16 for the associated USB devices. A frame list current index register 25 contains an index into the frame list. Each frame includes a number of transaction descriptions arranged as a linked list which are to be accomplished in an allotted interval, typically one millisecond, called a frame.

Each of these transaction descriptions describes an operation which it to be accomplished with respect to one associated USB device and contains a pointer to a next transaction description in the frame. Each transaction descriptor describes the length of the data to be transferred, the status of the last transaction, the type of transaction, various packet information, the maximum length for that transaction, and an address among other things.

The controller software constructs a schedule data structure in main memory. This data structure is an array of linked lists of frames. The host controller is given the starting address of a frame list and begins the execution of that list of frames. As each frame is executed, the individual transactions in that frame are executed one by one in a predetermined order with each being allotted its specified portion of the frame. As the next frame is executed, the individual transactions in that frame are executed. By arranging the transaction descriptors for the I/O devices in the same order in each frame of a frame list and allotting the same amount of the frame to a device in each frame, each device is allotted a set repeating time slot in each frame. Since accurately determined intervals are allotted to each function in each frame, operations which require substantial bandwidth may be allotted larger amounts of bandwidth so that they may function with the USB host controller 16. For example, those functions such as sound may be allotted an amount such as 25% of each time interval.

Each individual transaction is executed under command of the controller software stored in memory in accordance with a program which, generally, causes the controller to fetch the transfer descriptor, determine whether the transaction is to or from memory, and then carry out the transaction based on the information in the transaction descriptor. If the transfer is from memory, the controller obtains bus access and issues a request for data, waits for the first data to arrive, then fetches data of the specified maximum length from memory. If the transfer is from a USB device, the controller waits for the USB data and transfers that data not more than the maximum length to the address specified in the transaction descriptor.

Thus, for example, as the controller steps through each transaction descriptor in a frame, if data is not being transferred to the USB device described, the USB host controller 16 polls the I/O device to determine if it has an operation to carry out. Thus, in effect, the controller polls the I/O devices associated with the USB host controller 16, allotting the specified percentage of each frame to each individual I/O device. The controller circuit 21 polls the keyboard, among other I/O devices joined to the USB 16, to determine whether any requirement for keyboard operations exists. The operating system maintains a data structure in memory 13 for each of the different I/O devices joined to the USB host controller 16. If a key stroke has been generated, the controller circuit 21 determines from the transaction descriptor where in main memory the keyboard data structure is stored and transfers the data generated by the keyboard to that position in memory.

Figure 3:
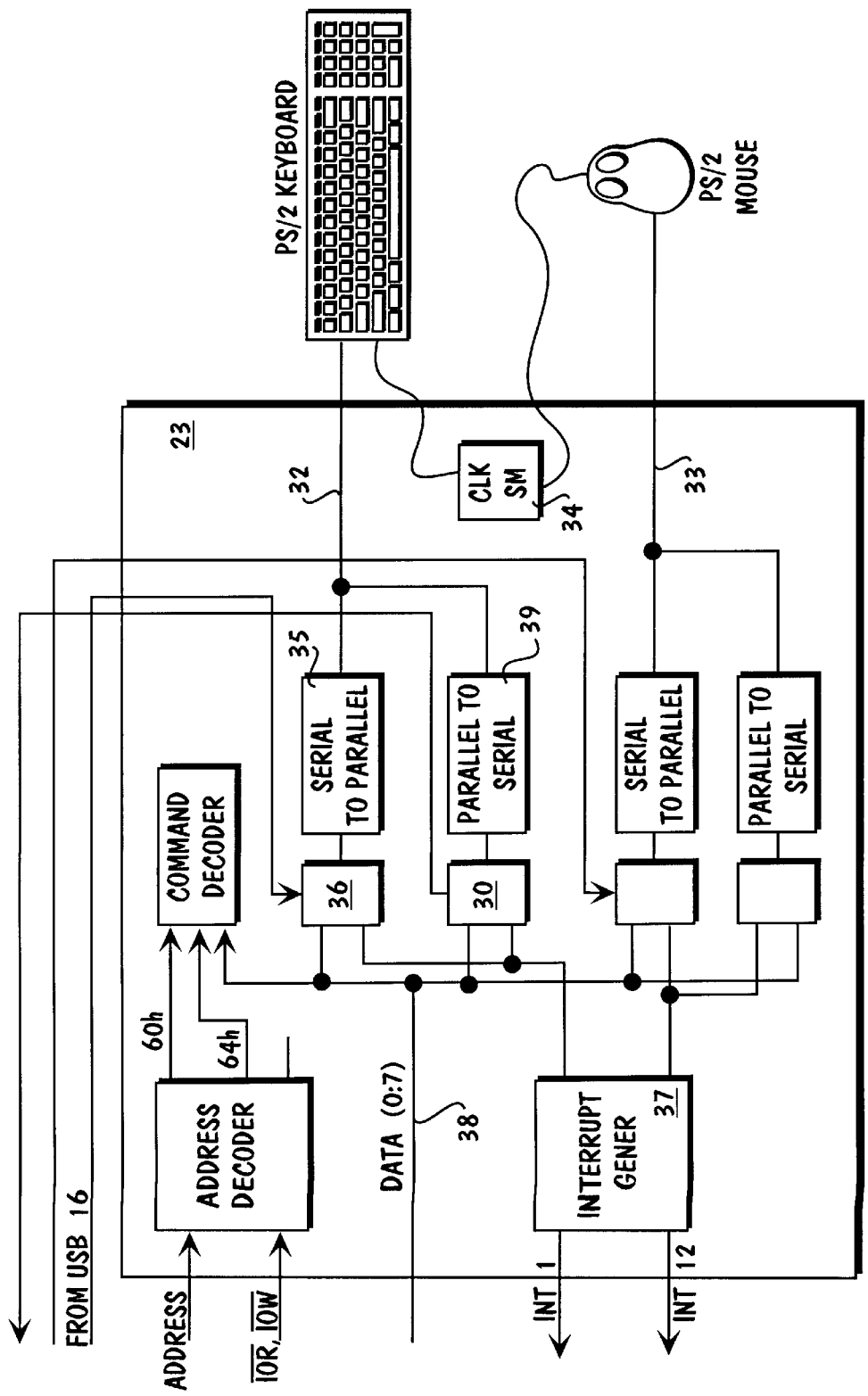
FIG. 3 is a circuit diagram illustrating a specific embodiment of the invention described generally in FIG. 2.
Figure 4:
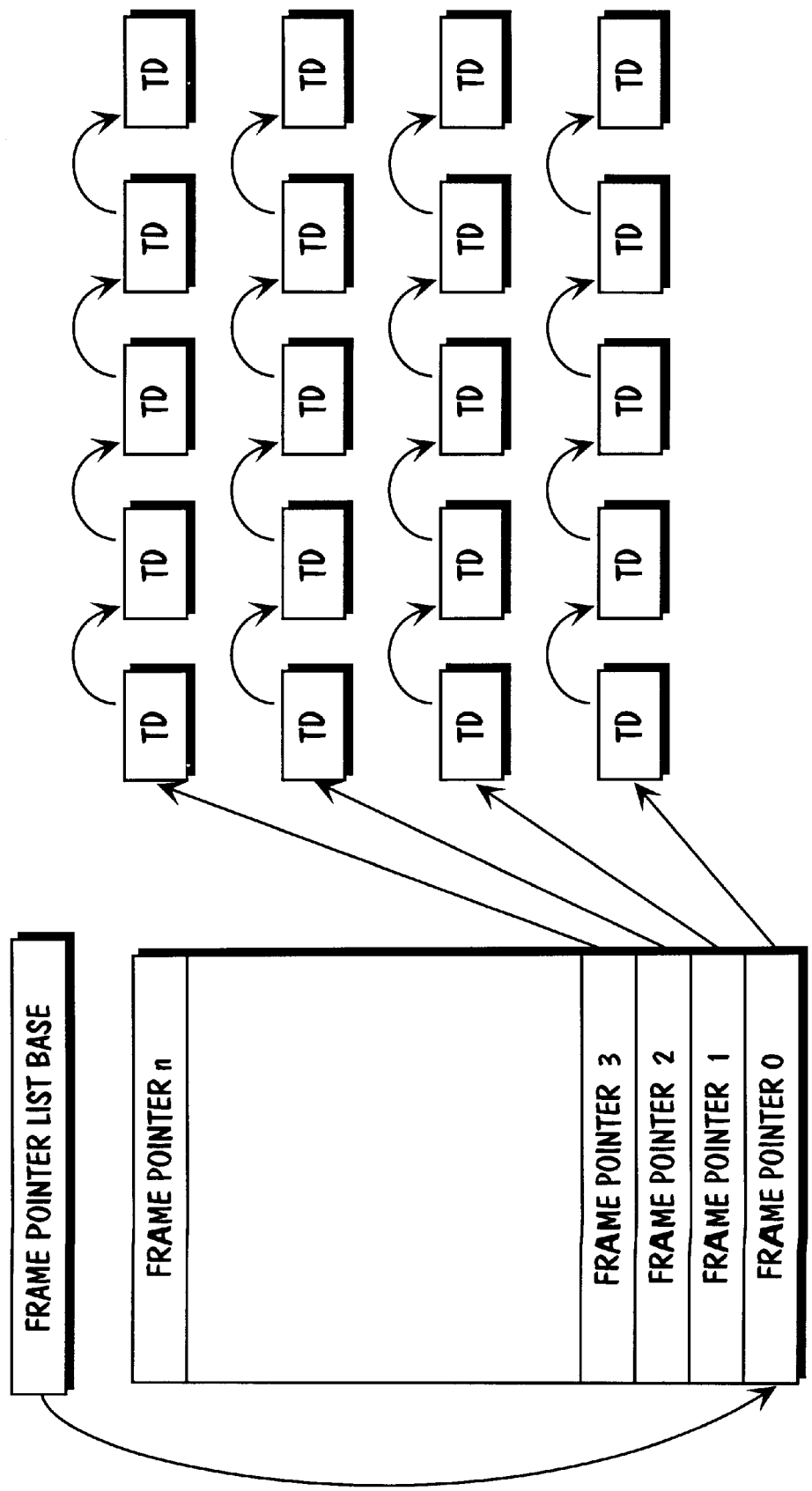
FIG. 4 is a diagram illustrating the general operation of a Universal Serial Bus controller.

In one embodiment of the present invention, also a part of the bridge circuit 18, is a circuit 23 referred to as a virtual keyboard controller which is used for operations with DOS. The circuit 23 replaces the Intel 8042 keyboard controller typically used in Intel-processor-based computers but carries out the same functions for a DOS keyboard as does that controller. To accomplish this, the circuit 23, shown in more detail in FIG. 3, includes a serial-to-parallel converter 35 for transferring data generated by the keyboard from serial into parallel form. The data generated is placed in a register 36 and causes an interrupt generator 37 to generate an interrupt to the system. When the interrupt is serviced, the central processing unit reads the data stored in the register 36 and responds in the manner indicated.

In a similar manner, the circuit 23 responds to commands addressed to I/O addresses 60H and 64H, typically used by the keyboard I/O address and mouse I/O address, to transfer the data provided on an eight bit data bus 38. For the keyboard, the data is sent to a register 30 and then transferred via a parallel-to-serial converter 39 to the keyboard. The keyboard is joined to the circuit by a data line 32, and a clock, controlled by a clock state machine 34 which enables the clock as necessary and protects against register overflow, is provided to clock the data in both directions. The data sent to the keyboard effects any operation required of the keyboard, such as lighting a light emitting diode.

The circuit 23 also includes similar serial-to-parallel and parallel-to-serial converters, registers, and is joined by a data line 33 to a mouse. This circuitry provides signals to and from the mouse and causes the interrupt generator 37 to generate an interrupt to the central processing unit in response to mouse actions in a manner similar to that described for the circuitry associated with the keyboard.

A major problem with this arrangement is that two keyboards are required to operate the system whenever functions under the DOS operating system are necessary. Most games operate under DOS; consequently, such games requires require a DOS keyboard be joined to the circuit 23 to provide the interrupts necessary to the operation of the games. A USB keyboard cannot generate these interrupts because the signals it generates are transferred by the bus master circuitry of the USB controller 16 to the keyboard data structure in main memory. Even if games are not to be run, reaching the setup program stored in the read only memory of the system BIOS requires a keyboard which can generate DOS commands. If a hard disk which stores the operating system is replaced, the USB keyboard cannot reach the DOS setup program until the operating system is functioning since the operating system is necessary to handle transfers to main memory data structures; and the operating system cannot function without the hardware setup changes in place.

Consequently, it is very desirable to provide an arrangement by which a single USB keyboard may generate and respond to DOS commands.

The present invention eliminates the need for a DOS keyboard by allowing DOS data to be redirected to a USB keyboard to be used with DOS operations. This is accomplished by monitoring a data structure which indicates a write to main memory or a write to register 36 has occurred. In one embodiment, this signal is a single bit, referred to as a DOS bit, in each command generated by the keyboard. If the DOS bit is in a first state, the USB host controller 16 sends the data to the register 36 instead of main memory. Because the USB host controller 16 assembles the serial data into a parallel form, the data may be directly deposited into register 36. The storing of the data in the register 36 causes the controller to signal the interrupt generator 37, and an interrupt (INT 1) is generated. The central processing unit 11 ultimately receives the interrupt, reads the register 36, and carries out the operation specified by the data contained in the register. If the DOS bit indicates a USB device, then the normal operations of the controller 16 are carried out; and the keyboard data is transferred by the USB controller to the keyboard data structure in main memory.

In order to accomplish these operations, the controller 16 must respond to the DOS bit indication that data it to be used for a DOS operation by transferring the data to the register 36. This is accomplished by one or more bits in the data structure. The DOS bit provides and address for the controller transfer operation which replaces the main memory address of the data structure. This, in effect, allows the bus master to transfer data addresses other than main memory addresses.

A similar bit may be placed in a command generated by a USB mouse to accomplish the transfer of mouse data to DOS operations by means of the mouse register of the controller 23. In a similar manner, the storage of the data in the mouse register causes the generation of an interrupt (INT 12) indicating a pending DOS mouse operation; and the central processing unit ultimately reads the data in the mouse register and carries out the operation.

Thus, only a single USB keyboard is required to accomplish operations under the modern operating system and those under DOS.

It will be recognized, that the concept may be extended to provide apparatus and methods by which other I/O devices designed to function with an Universal Serial Bus may function as well with DOS operations. Thus, any number of devices may utilize such a signal to indicate that a DOS operation is required rather than an operation under the operating system with which the Universal Serial Bus functions. The number of I/O registers for any device is not limited to one or two registers but may encompass a larger number sufficient to carry out operations of particular I/O devices. The invention may be used with devices such as hard and floppy drives. The use of such a signal and a controller capable of detecting that signal and responding to send data to an address other than main memory which may be stored locally allows any number of different devices to function with operating systems such as DOS for which they are not originally designed.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method of generating signals using a Universal Serial Bus (USB) host controller and a keyboard comprising:
   receiving data from the keyboard,
   receiving a signal associated with the data from the keyboard, the signal indicating where the data will be written;
   if the signal is in a first state,
   writing the data to a register; and
   generating an interrupt to a central processing unit (CPU)
   if the signal is in a second state,
   writing the data to main memory.

2. The method of claim 1 further comprising transferring the data between an address in main memory and an input/output (I/O) device connected to the USB host controller.

3. The method of claim 1 further comprising changing the address in main memory in response to the data.

4. The method of claim 1 wherein transferring the data to a register comprises using a bus master associated with the USB host controller to transfer the marked data to a register.

5. The method of claim 1 wherein transferring the data to a register comprises writing the data from an I/O device connected to the USB host controller to an address other than main memory.

6. The method of claim 5 wherein writing the data to a register further comprises writing an indication to a memory data structure to indicate an operation to be performed by the USB host controller.

7. The method of claim 5 wherein writing the data to a register comprises transferring the data to a register by the USB host controller.

8. The method of claim 1 wherein the signal is in the first state when the keyboard is not a USB keyboard.

9. The method of claim 1 wherein the signal is in the second state when the keyboard is a USB keyboard.

10. A computer system comprising:

a central processing unit (CPU);

a Universal Serial Bus (USB) host controller;

a keyboard;

a main memory for storing data coupled to the CPU and the USB host controller;

a bus device coupled to the main memory and the USB host controller for transferring data between the main memory and the USB host controller;

an interrupt generator coupled to the CPU, the interrupt generator to generate an interrupt in response to data being placed in a buffer; and a transfer device, responsive to data generated by the keyboard, which detects the data and a signal associated with the data indicating where the data will be written, transfers the data to the buffer when the signal is in a first state, and transfers the data to main memory when the signal is in a second state.

11. The computer system of claim 10 wherein the transfer device transfers the data between an address in main memory and an input/output (I/O) device connected to the USB host controller.

12. The computer system of claim 11 further comprising an address modifier coupled to the main memory which changes the address in main memory in response to the data.

13. The computer system of claim 10 wherein the transfer device comprises a direct memory access (DMA) device.

14. The computer system of claim 10 wherein the transfer device transfers the data from an I/O device connected to the USB host controller to an address other than main memory.

15. The computer system of claim 14 further comprising a memory modification device coupled to the main memory which writes an indication to a memory data structure to indicate an operation to be performed by the USB host controller.

16. The computer system of claim 14 wherein the transfer device transfers the data from an I/O device connected to the USB host controller to a register.

17. An apparatus comprising:

a universal serial bus (USB) controller including
 a receiver for receiving data from an input/output (I/O) device and for receiving a signal associated with the data indicating where the data will be written;
 a virtual keyboard controller for writing the data in a register and generating an interrupt to a central processing unit when the signal is in a first state; and
 a controller circuit for writing the data to main memory when the signal is in a second state.

18. The apparatus of claim 17 wherein the signal is in the first state when the I/O device is not a USB compatible device.

19. The apparatus of claim 17 wherein the signal is in the second state when the I/O device is a USB compatible device.

20. A computer readable medium containing instructions which, when executed in a processing system, cause the processing system to perform a method for generating signals using a Universal Serial Bus (USB) host controller comprising:

receiving data from a keyboard;

receiving a signal associated with the data from the keyboard, the signal indicating where the data will be written;

if the signal is in a first state,
 writing the data to a register, and
 generating an interrupt to a central processing unit (CPU); and if the signal is in a second state,
 writing the data to main memory.

21. The medium of claim 20 wherein the signal is in the first state when the keyboard is not a USB keyboard.

22. The medium of claim 20 wherein the signal is in the second state when the keyboard is a USB keyboard.

* * * * *